United States Patent
Jhuang et al.

(10) Patent No.: US 11,804,080 B2
(45) Date of Patent: Oct. 31, 2023

(54) METHOD AND SYSTEM FOR INSPECTING AND SCORING VEHICLE TRANSPORTATION

(71) Applicant: INSTITUTE FOR INFORMATION INDUSTRY, Taipei (TW)

(72) Inventors: Shih-Sian Jhuang, Taipei (TW); Chih-Min Shih, Taipei (TW); Hsing-Yu Chen, Taipei (TW); I-Chou Hung, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 145 days.

(21) Appl. No.: 17/536,446

(22) Filed: Nov. 29, 2021

(65) Prior Publication Data
US 2023/0169801 A1 Jun. 1, 2023

(51) Int. Cl.
G07C 5/02 (2006.01)
(52) U.S. Cl.
CPC .................... *G07C 5/02* (2013.01)
(58) Field of Classification Search
CPC ........ G07C 5/02; G07C 5/008; G07C 5/0808; G07C 5/0841; Y02T 10/40
USPC .......................................... 340/936
See application file for complete search history.

(56) References Cited

U.S. PATENT DOCUMENTS

| | | | |
|---|---|---|---|
| 11,548,516 B2 * | 1/2023 | Yu ..................... | H04L 12/40013 |
| 2021/0070309 A1 * | 3/2021 | Kodali ................. | B60W 50/14 |
| 2021/0166323 A1 * | 6/2021 | Fields .................... | G08G 1/162 |
| 2022/0126864 A1 * | 4/2022 | Moustafa ......... | G08G 1/096758 |
| 2022/0237956 A1 * | 7/2022 | Kumar .................... | B60Q 9/00 |
| 2023/0098727 A1 * | 3/2023 | Sahebnassagh ........ | G06V 10/82 |
| | | | 701/33.3 |

* cited by examiner

*Primary Examiner* — Hirdepal Singh
(74) *Attorney, Agent, or Firm* — Marshall Lerner; Steven Kim; Kleinberg & Lerner LLP

(57) ABSTRACT

The present invention is a method and a system for inspecting and scoring vehicle transportation. The system includes a cloud server for performing an intersection analysis, a speed analysis, and a smoothness analysis to generate key features. The cloud server further performs a supervised learning scoring process based on the key features to generate an audit score. Therefore, the present invention can provide a verified reference for the vehicle transport industry to manage drivers, for avoiding human subjective judgments, and auditing and evaluating drivers' driving behaviors in an objective and efficient manner.

21 Claims, 10 Drawing Sheets

METHOD AND SYSTEM FOR INSPECTING AND SCORING VEHICLE TRANSPORTATION

BACKGROUND OF THE INVENTION

1. Field of the Invention

The present invention relates to a method and a system for scoring, more particularly a method and a system for inspecting and scoring vehicle transportation.

2. Description of the Related Art

In recent years, vehicles in the vehicle transportation industry, such as buses, passenger transport vehicle, tourist buses, etc., have caused many traffic accidents due to problematic driving behaviors. For example, when turning at an intersection, if a driver does not stop to observe whether there are other pedestrians or vehicles, it will easily lead to car accidents.

Although most of the vehicles have installed driving recorders, the driving recorders can only record driving behaviors of the vehicles, and cannot record driving behaviors of drivers of the vehicles in the vehicle transportation industry. Therefore, it is difficult to evaluate the driving behaviors of the drivers. In addition, some carriers in the vehicle transportation industry have designed a feedback method, such as asking passengers to fill out a questionnaire to rate the drivers' driving behaviors. However, it is too subjective to judge the drivers' driving behaviors based on the results of human scoring alone, and a method for following-up manual inspection is labor-intensive and highly time-consuming. Namely, there is no method for effectively inspecting and scoring drivers' driving behaviors. Therefore, a conventional method for inspecting and scoring drivers' driving behaviors still needs further improvement.

SUMMARY OF THE INVENTION

The present invention provides a method and a system for inspecting and scoring vehicle transportation. The present invention can help carriers in the vehicle transportation industry or smart driving developers to build an automatic inspecting and scoring system.

The method for inspecting and scoring vehicle transportation is executed by a cloud server, and includes steps of: executing an intersection analysis to generate a non-stop rate at corners, times of non-stop corners, and an average of minimum cornering speeds; executing a speed analysis to generate a sharp deceleration duration, a rapid acceleration duration, an overspeed duration, an overspeed ratio, and an average of maximum overspeeds; executing a smoothness analysis to generate a rate of heavy accelerator pedaling, times of vehicle body tilting forward, times of vehicle body tilting backward, times of vehicle body rolling, and times of vehicle body vibrations; executing a supervised learning scoring process to generate an audit score according to the non-stop rate at corners, the times of non-stop corners, the average of minimum cornering speeds, the sharp deceleration duration, the rapid acceleration duration, the overspeed duration, the overspeed ratio, the average of maximum overspeeds, the rate of heavy accelerator pedaling, the times of vehicle body tilting forward, the times of vehicle body tilting backward, the times of vehicle body rolling, and the times of vehicle body vibrations.

Moreover, the system for inspecting and scoring vehicle transportation includes the cloud server, and the cloud server executes the intersection analysis to generate the non-stop rate at corners, the times of non-stop corners, and the average of minimum cornering speeds. The cloud server further executes the speed analysis to generate the sharp deceleration duration, the rapid acceleration duration, the overspeed duration, the overspeed ratio, and the average of maximum overspeeds. The cloud server further executes the smoothness analysis to generate the rate of heavy accelerator pedaling, the times of vehicle body tilting forward, the times of vehicle body tilting backward, the times of vehicle body rolling, and the times of vehicle body vibrations. The cloud server further executes the supervised learning scoring process to generate the audit score according to the non-stop rate at corners, the times of non-stop corners, the average of minimum cornering speeds, the sharp deceleration duration, the rapid acceleration duration, the overspeed duration, the overspeed ratio, the average of maximum overspeeds, the rate of heavy accelerator pedaling, the times of vehicle body tilting forward, the times of vehicle body tilting backward, the times of vehicle body rolling, and the times of vehicle body vibrations.

The cloud server receives vehicle information, inertial measurement information, and positioning information of a vehicle device, and the cloud server collects statistics and analyzes the information. Therefore, the present invention can automatically generate judgements of driving behaviors, and can report the judgements to drivers to remind the drivers to improve their driving behaviors. Further, the judgements can be stored to provide the carriers in the vehicle transportation industry or the smart driving developers for references to improve drivers' driving behaviors.

The present invention directly receives information from the vehicle device, and the information is judged by the cloud server to avoid subjective judgement made by humans. Therefore, the present invention can audit and evaluate the drivers' driving behaviors in an objective and efficient manner.

DETAILED DESCRIPTION OF THE INVENTION

Figure 1:
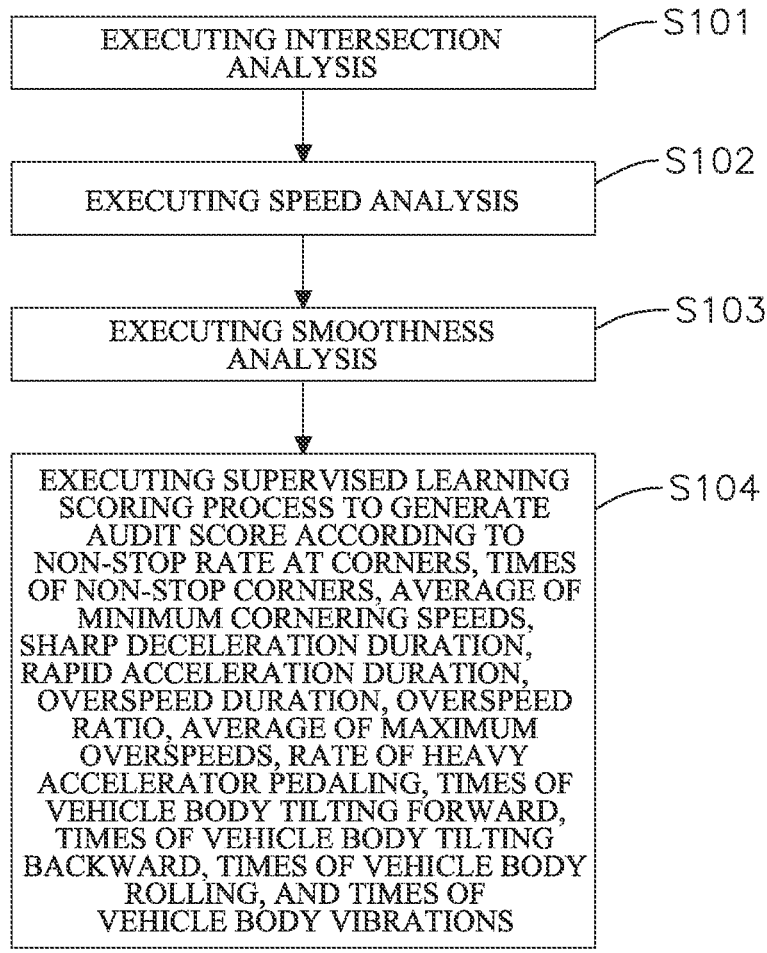
FIG. 1 is a flowchart of a first embodiment of a method for inspecting and scoring vehicle transportation of the present invention.
Figure 2:
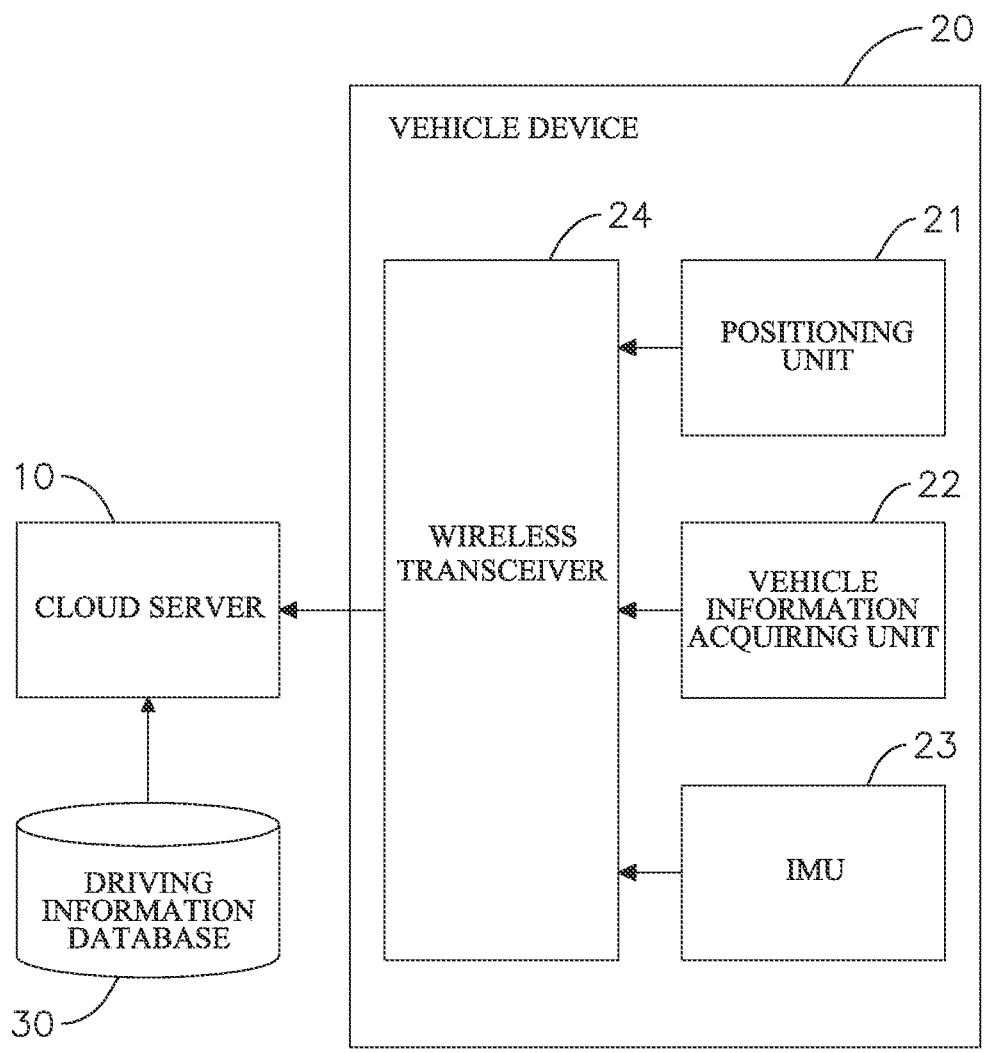
FIG. 2 is a block diagram of a system for inspecting and scoring vehicle transportation of the present invention.

With reference to FIG. 1 and FIG. 2, a method for inspecting and scoring vehicle transportation is executed by a cloud server 10. A system for inspecting and scoring vehicle transportation includes the cloud server 10 and a vehicle device 20. The vehicle device 20 is installed in a vehicle, and senses a state of the vehicle to generate information. In an embodiment, the vehicle device 20 includes a positioning unit 21, a vehicle information acquiring unit 22, an inertial measurement unit (IMU) 23, and a wireless transceiver 24.

The positioning unit 21 generates vehicle position information according to a position of the vehicle. For example, the positioning unit 21 is a GPS unit. The vehicle information acquiring unit 22 generates speed information, brake information, accelerator pedaling information, and door information by sensing a state of the vehicle. For example, the vehicle information acquiring unit 22 is an on-board diagnostics (OBD) unit to sense a current speed, an accelerator pedaling depth, or a door state for generating corresponding information. The IMU 23 generates inertial measurement information by sensing the vehicle. For example, the inertial measurement information includes angular velocity information and acceleration information. The wireless transceiver 24 is connected to the positioning unit 21, the vehicle information acquiring unit 22, and the IMU 23 to receive the vehicle position information, the speed information, the brake information, the accelerator pedaling information, the door information, and the inertial measurement information from the positioning unit 21, the vehicle information acquiring unit 22, and the IMU 23. The wireless transceiver 24 further transmits the vehicle position information, the speed information, the brake information, the accelerator pedaling information, the door information, and the inertial measurement information to the cloud server 10.

A first embodiment of the method for inspecting and scoring vehicle transportation includes steps as follows:

S101: the cloud server 10 executes an intersection analysis to generate a non-stop rate at corners, times of non-stop corners, and an average of minimum cornering speeds.

Figure 3:
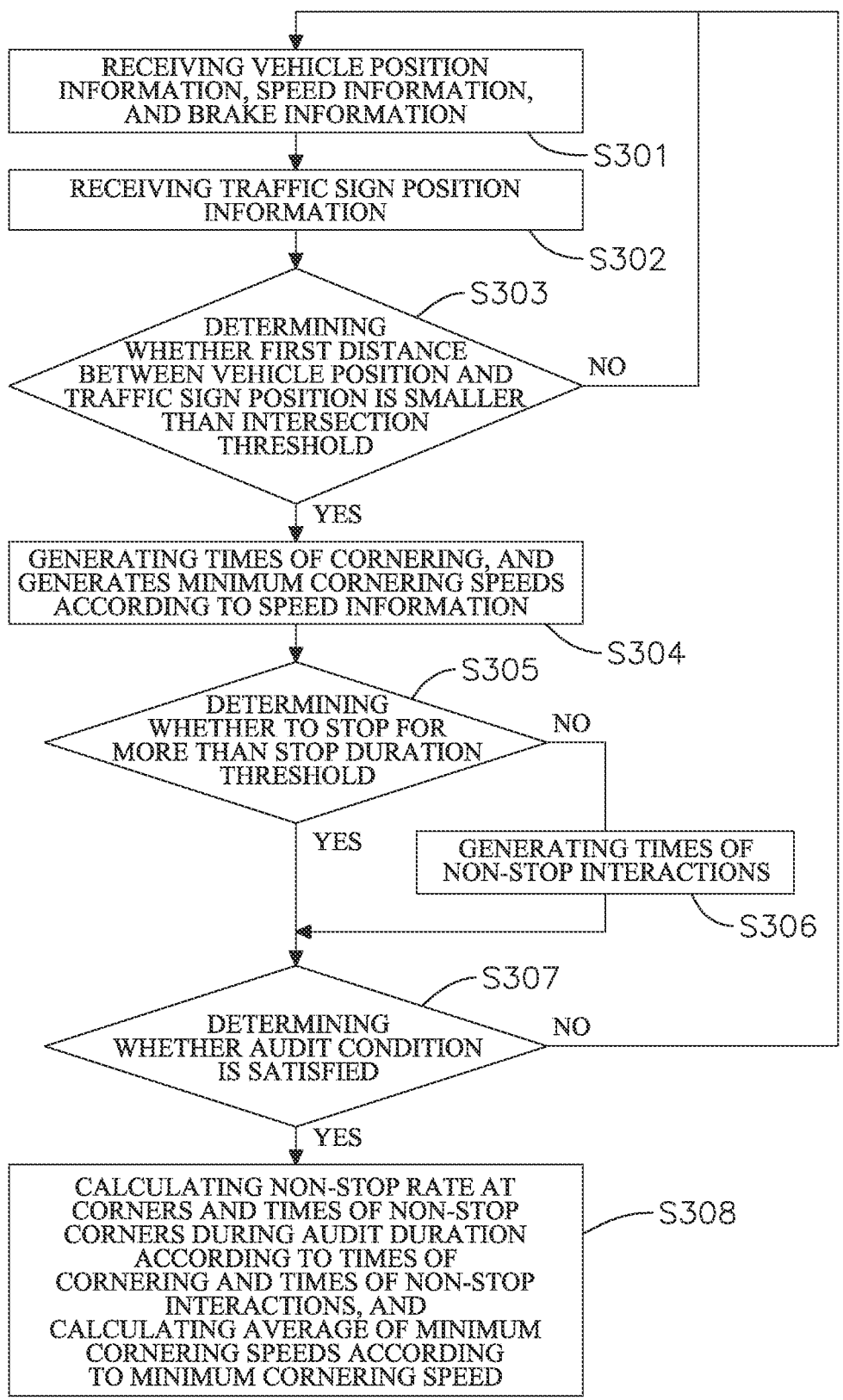
FIG. 3 is a flowchart of an intersection analysis of the method for inspecting and scoring vehicle transportation of the present invention.

Further with reference to FIG. 3, when the cloud server 10 executes the intersection analysis, the cloud server 10 is communicatively connected to the wireless transceiver 24 of the vehicle device 20. In step S301, the cloud server 10 receives the vehicle position information, the speed information, and the brake information from the wireless transceiver 24. In step S302, the cloud server 10 further receives traffic sign position information from a driving information database 30. In step S303, the cloud server 10 further determines whether a first distance between a vehicle position and a traffic sign position is smaller than an intersection threshold according to the vehicle position information and the traffic sign position information. In step S304, when the first distance is smaller than the intersection threshold, the cloud server 10 generates times of cornering, and generates minimum cornering speeds according to the speed information. In step S305, the cloud server 10 further determines whether to stop for more than a stop duration threshold according to the brake information. In step S306, when the vehicle is non-stopping for more than the stop duration threshold, the cloud server 10 generates times of non-stop interactions. In step S307, the cloud server 10 further determines whether an audit condition is satisfied. In step S308, when the audit condition is satisfied, the cloud server 10 calculates the non-stop rate at corners and the times of non-stop corners during an audit duration according to the times of cornering and the times of non-stop interactions, and calculates the average of minimum cornering speeds according to the minimum cornering speed. When the audit condition is dissatisfied, the cloud server 10 receives the vehicle position information, the speed information, and the brake information from the wireless transceiver 24 of the vehicle device 20 again.

For example, the cloud server 10 determines the vehicle position by receiving the vehicle position information from the vehicle device 20, and compares the vehicle position with the traffic sign position obtained from the driving information database 30. When the first distance between the vehicle position and the traffic sign position is smaller than the intersection threshold, it means that the vehicle is close enough to the traffic sign. Generally speaking, the traffic sign is set at an intersection, so when the vehicle is close enough to the traffic sign, it means that the vehicle is currently at the intersection. Because when the vehicle passes through the intersection, the vehicle needs to slow down to maintain driving safety. If the cloud server 10 determines that the vehicle has not decelerated or stopped at the intersection based on the brake information, a driver's driving behavior is determined to be poor. Therefore, the cloud server 10 uses the times of non-stop corners as one of its audit criteria.

In addition, when the vehicle is at the intersection, that is, when the first distance is smaller than the intersection threshold, the cloud server 10 can further determine whether the vehicle is cornering according to the vehicle position information. If the vehicle is cornering, the times of cornering are counted. If the vehicle does not corner, the times of cornering are not counted. The cloud server 10 further records the minimum cornering speed when the vehicle is cornering according to the speed information.

When the audit condition is satisfied, such as when the vehicle completes a trip, that is, the vehicle drives from a start to an end, the cloud server 10 can calculate the non-stop rate at corners, the times of non-stop corners, and the average of minimum cornering speeds according to the times of cornering, the times of non-stop interactions, and the minimum cornering speeds between the start and the end of the trip. For example, the non-stop rate at corners is a number of dividing the times of non-stop corners by the times of cornering. The average of minimum cornering speeds is an average of the minimum cornering speeds at the interactions between the start and the end of the trip.

The intersection analysis uses the vehicle position information, the speed information, and the brake information to determine whether there is a stop when cornering at the intersection, so as to avoid traffic accidents.

Step S102: the cloud server 10 executes a speed analysis to generate a sharp deceleration duration, a rapid acceleration duration, an overspeed duration, an overspeed ratio, and an average of maximum overspeeds.

Figure 4:
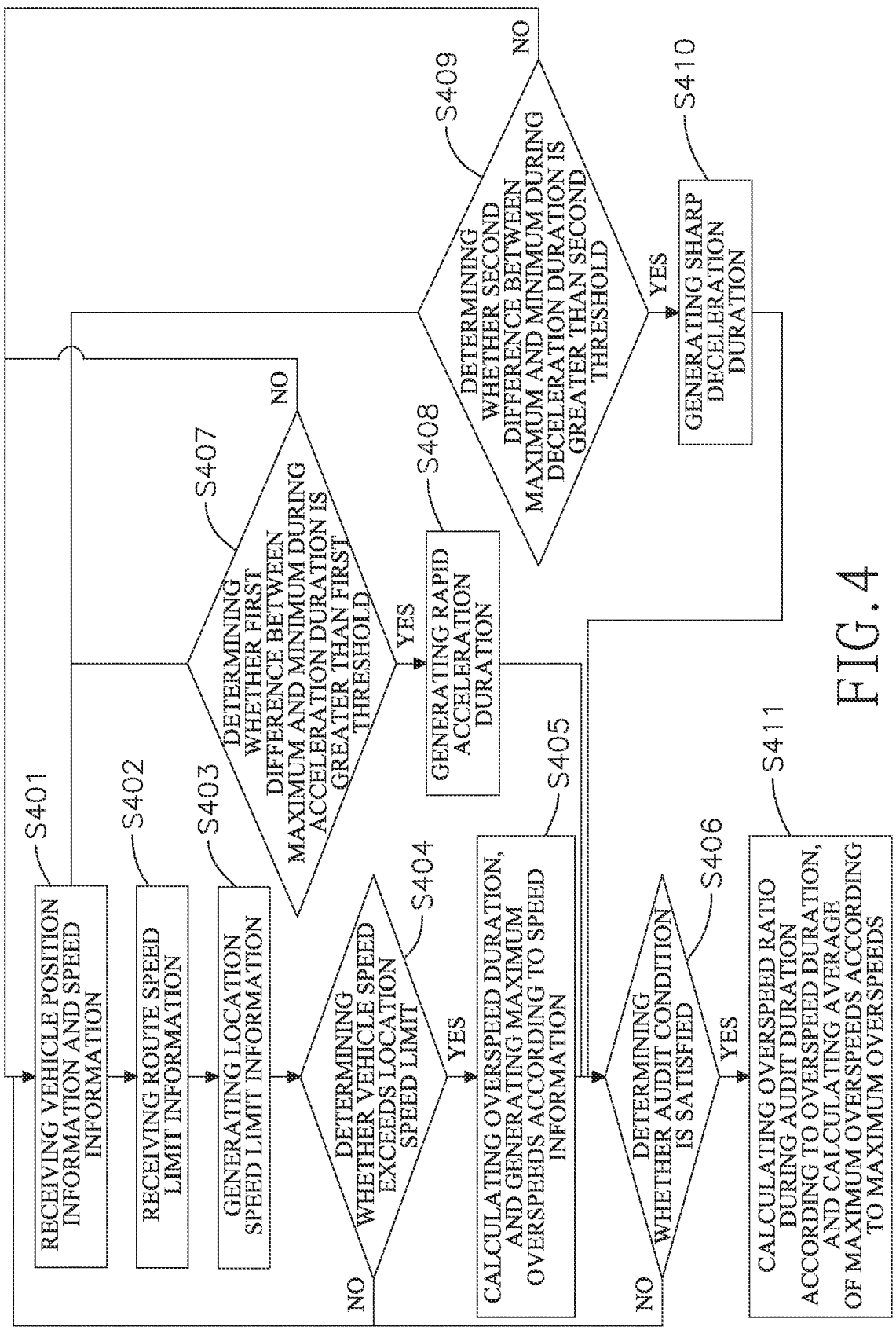
FIG. 4 is a flowchart of a speed analysis of the method for inspecting and scoring vehicle transportation of the present invention.

Further with reference to FIG. 4, when the cloud server 10 executes the speed analysis, the cloud server 10 is communicatively connected to the wireless transceiver 24 of the vehicle device 20. In step S401, the cloud server 10 receives the vehicle position information and the speed information from the wireless transceiver 24 of the vehicle device 20. In step S402, the cloud server 10 further receives the route speed limit information from the driving information database 30. In step S403, the cloud server 10 further generates location speed limit information according to the vehicle position information and the route speed limit information. In step S404, the cloud server 10 determines whether a vehicle speed exceeds a location speed limit according to the speed information and the location speed limit information. In step S405, when the vehicle speed exceeds the location speed limit, the cloud server 10 further calculates the overspeed duration, and generates maximum overspeeds according to the speed information. In step S406, the cloud server 10 further determines whether an audit condition is satisfied. In step S407, the cloud server 10 further determines whether a first difference between a maximum and a minimum during an acceleration duration is greater than a first threshold. In step S408, when the first difference is greater than the first threshold, the cloud server 10 generates the rapid acceleration duration, and determines whether the audit condition is satisfied. In step S409, the cloud server 10 further determines whether a second difference between a maximum and a minimum during a deceleration duration is greater than a second threshold. In step S410, when the second difference is greater than the second threshold, the cloud server 10 generates the sharp deceleration duration, and determines whether the audit condition is satisfied. In step S411, when the audit condition is satisfied, the cloud server 10 calculates the overspeed ratio during an audit duration according to the overspeed duration, and calculates the average of maximum overspeeds according to the maximum overspeeds. When the audit condition is dissatisfied, the cloud server 10 receives the vehicle position information and speed information from the wireless transceiver of the vehicle device again.

For example, the cloud server 10 determines the vehicle position by receiving the vehicle position information from the vehicle device 20, and determines the vehicle speed according to the speed information. The cloud server 10 further receives the route speed limit information from the driving information database 30. Since different driving routes have different speed limits, the cloud server 10 first determines the vehicle position based on the vehicle position information, and determines the location speed limit corresponding to the vehicle position. For example, if the vehicle position is in an urban area, the location speed limit is 50 km/h. But if the vehicle position is on a highway, the location speed limit is 100 km/h. After the cloud server 10 determines the location speed limit information, the cloud server 10 can determine whether the vehicle is overspeeding based on the speed information and the location speed limit information. When the vehicle speed is greater than the location speed limit, the cloud server 10 determines that the vehicle is overspeeding. The cloud server 10 further calculates a duration for which the vehicle is overspeeding as the overspeed duration. When the vehicle is overspeeding, the cloud server 10 also records the maximum overspeed.

When the audit condition is satisfied, such as when the vehicle drives from the start to the end, the cloud server 10 can calculate times of overspeeds and the maximum overspeeds of each time when the vehicle is overspeeding from the start to the end. The cloud server 10 further calculates the average of maximum overspeeds according to the maximum overspeeds. In addition, the audit duration is, for example, a duration from the start to the end of the trip. The cloud server 10 calculates the overspeed ratio, which is obtained by dividing the overspeed duration by the audit duration. The average of maximum overspeeds is an average of the maximum overspeeds from the start to the end, such as dividing a sum of the maximum overspeeds by the times of overspeeds.

In addition, after the cloud server 10 receives the vehicle position information and the speed information, the cloud server 10 determines whether the vehicle is suddenly accelerating or decelerating based on the speed information. If the vehicle is accelerating, the first difference between the maximum vehicle speed and a minimum vehicle speed is greater than a first threshold, it means that the vehicle is accelerating suddenly. Therefore, the cloud server 10 generates the rapid acceleration duration according to a time difference corresponding to the first difference. When the audit condition is satisfied, the cloud server 10 adds all the rapid acceleration durations within the audit duration.

In the same way, when the second difference is greater than the second threshold, it means that the vehicle is decelerating suddenly. Therefore, the cloud server 10 generates the sharp deceleration duration. When the audit condition is satisfied, the cloud server 10 adds all the sharp deceleration durations within the audit duration.

The speed analysis uses the vehicle position information and the speed information to determine situations of overspeeding, rapid acceleration, and sharp deceleration.

Step S103: the cloud server 10 executes a smoothness analysis to generate a rate of heavy accelerator pedaling, times of vehicle body tilting forward, times of vehicle body tilting backward, times of vehicle body rolling, and times of vehicle body vibrations.

Figure 5A:
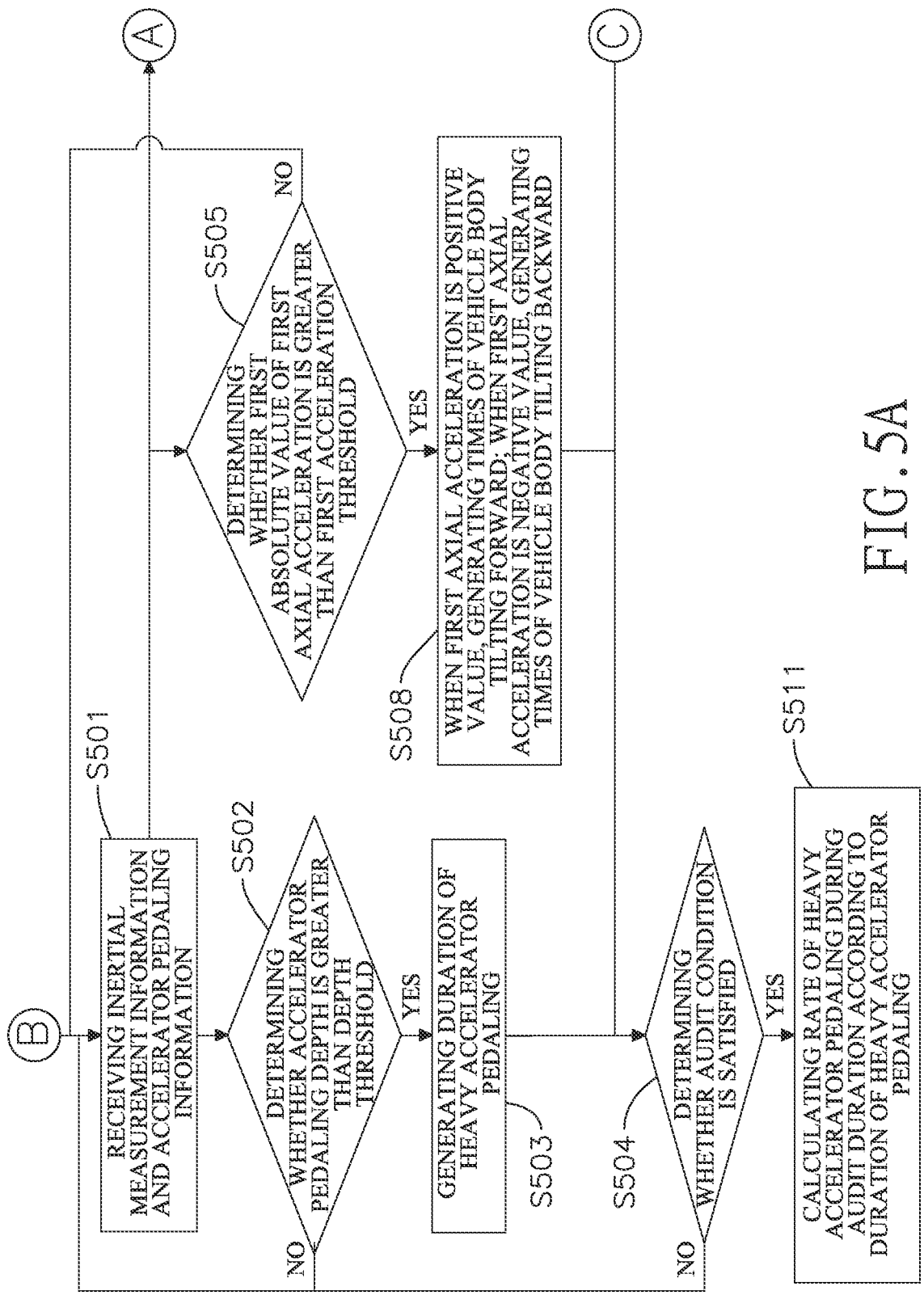
FIG. 5A and FIG. 5B are a flowchart of a smoothness analysis of the method for inspecting and scoring vehicle transportation of the present invention.
Figure 5B:
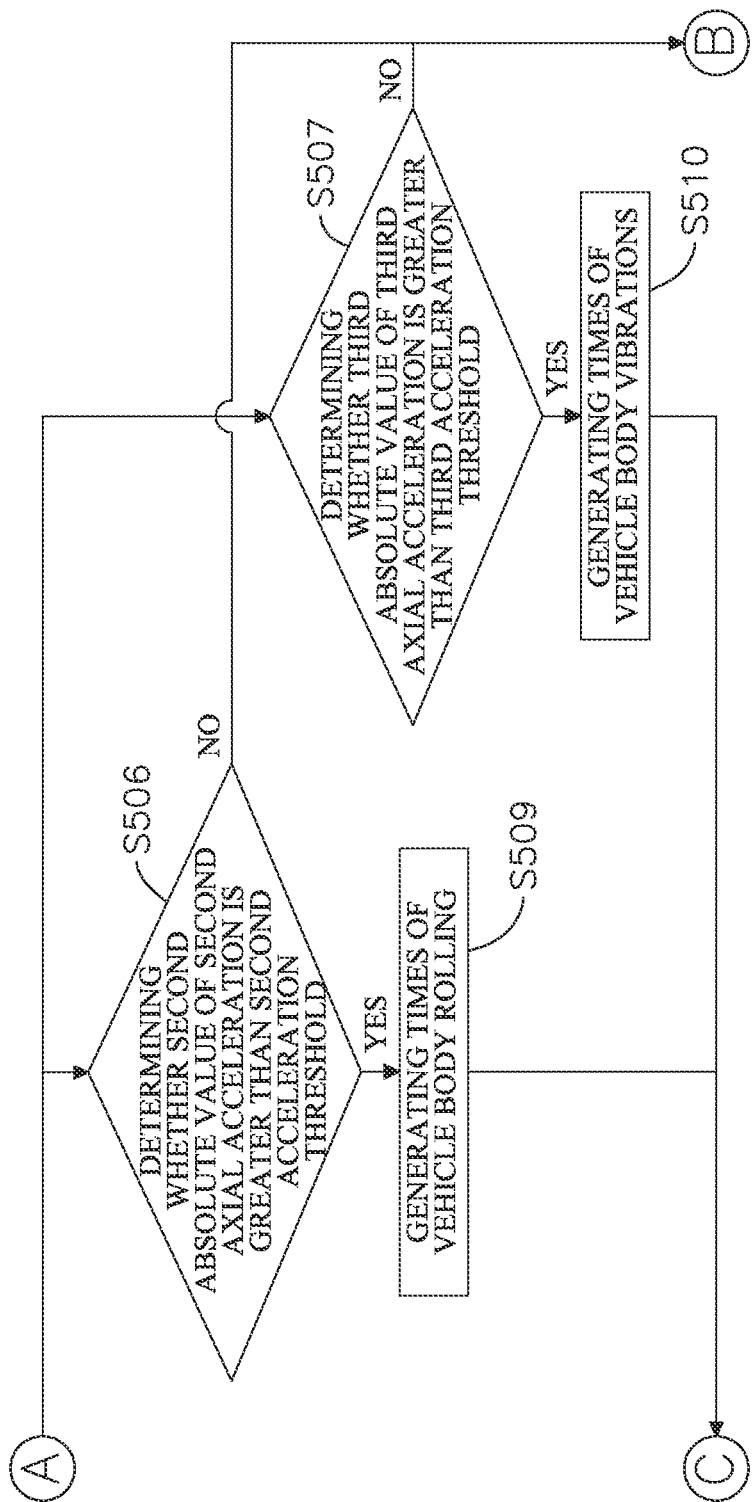

Further with reference to FIG. 5A and FIG. 5B, when the cloud server 10 executes the smoothness analysis, the cloud server 10 is communicatively connected to the wireless transceiver 24 of the vehicle device 20. In step S501, the cloud server 10 receives the inertial measurement information and the accelerator pedaling information from the wireless transceiver 24 of the vehicle device 20. In step S502, the cloud server 10 further determines whether an accelerator pedaling depth is greater than a depth threshold according to the accelerator pedaling information. In step S503, when the accelerator pedaling depth is greater than the depth threshold, the cloud server 10 generates a duration of heavy accelerator pedaling. In step S504, the cloud server 10 determines whether an audit condition is satisfied. In step S505, the cloud server 10 further determines whether a first absolute value of a first axial acceleration is greater than a first acceleration threshold according to the inertial measurement information. In step S506, the cloud server 10 determines whether a second absolute value of a second axial acceleration is greater than a second acceleration threshold according to the inertial measurement information. In step S507, the cloud server 10 determines whether a third absolute value of a third axial acceleration is greater than a third acceleration threshold according to the inertial measurement information.

In step S508, when the first absolute value is greater than the first acceleration threshold, and when the first axial acceleration is a positive value, the cloud server 10 generates the times of vehicle body tilting forward, and then the cloud server 10 executes step S504 to determine whether the audit condition is satisfied. But when the first axial acceleration is a negative value, the cloud server 10 generates the times of vehicle body tilting backward, and then the cloud server 10 executes step S504 to determine whether the audit condition is satisfied.

In step S509, when the second absolute value is greater than the second acceleration threshold, the cloud server 10 generates the times of vehicle body rolling, and then the cloud server 10 executes step S504 to determine whether the audit condition is satisfied.

In step S510, when the third absolute value is greater than the third acceleration threshold, the cloud server 10 generates the times of vehicle body vibrations, and then the cloud server 10 executes step S504 to determine whether the audit condition is satisfied.

In step S511, when the audit condition is satisfied, the cloud server 10 calculates the rate of heavy accelerator pedaling during an audit duration according to the duration of heavy accelerator pedaling. But, when the audit condition is dissatisfied, the cloud server 10 receives the inertial measurement information and the accelerator pedaling information from the wireless transceiver of the vehicle device again.

For example, the cloud server 10 determines the accelerator pedaling depth by receiving the accelerator pedaling information from the vehicle device 20. When the accelerator pedaling depth is greater than the depth threshold, it means that the driver is heavily accelerator pedaling, and the cloud server 10 accordingly generates the duration of heavy accelerator pedaling to record a duration for which the driver is heavily accelerator pedaling. When the audit condition is satisfied, the cloud server 10 can record a total duration for which the driver is heavily accelerator pedaling within the audit duration according to the duration of heavy accelerator pedaling. The cloud server 10 can further calculate the rate of heavy accelerator pedaling by dividing the duration of heavy accelerator pedaling by the audit duration.

In addition, the cloud server 10 also receives the inertial measurement information from the vehicle device 20, and determines smoothness of the vehicle based on an acceleration of the inertial measurement information. For example, the first axis is a forward direction of the vehicle, the second axis is a side direction of the vehicle, and the third axis is a vertical direction of the vehicle. When the first absolute value of the first axial acceleration is greater than the first acceleration threshold, it means that the vehicle is advancing or retreating violently, which will cause the vehicle body to tilt forward or backward. The cloud server 10 further determines the vehicle body is tilting forward or backward according to the positive and negative values of the first axial acceleration. For example, when the first axial acceleration is positive, it means that the vehicle is advancing violently, which will cause the vehicle body to tilt backward. When on the contrary, it will cause the vehicle body to tilt forward. When the second absolute value of the second axial acceleration is greater than the second acceleration threshold, it means that the vehicle is turning left or right violently, causing the vehicle body to roll. When the third absolute value of the third axial acceleration is greater than the third acceleration threshold, it means that the vehicle is vibrating violently up and down.

Therefore, whenever the first absolute value is greater than the first acceleration threshold, the cloud server 10 will determine the forward or backward tilt of the vehicle body according to the positive or negative value of the first axis acceleration, and count the times of vehicle body tilting forward or backward. Similarly, whenever the second absolute value is greater than the second acceleration threshold, the cloud server 10 counts the times of vehicle body rolling, and whenever the third absolute value is greater than the third acceleration threshold, the cloud server 10 counts the times of vehicle body vibrations.

When the audit condition is satisfied, the cloud server 10 outputs the times of vehicle body tilting forward, the times of vehicle body tilting backward, the times of vehicle body rolling, and the times of vehicle body vibrations.

In the embodiment, the first acceleration threshold is calculated by multiplying a square of the first axial acceleration and a dynamic adjustment parameter. The second acceleration threshold is calculated by multiplying a square of the second axial acceleration and the dynamic adjustment parameter. The third acceleration threshold is calculated by multiplying a square of the third axial acceleration and the dynamic adjustment parameter. The dynamic adjustment parameter is related to types of vehicles. For example, the dynamic adjustment parameter corresponding to a bus is different from the dynamic adjustment parameter corresponding to a small car.

Further, in another embodiment, the audit duration may be a fixed duration, such as 24 hours, and the cloud server 10 further determines whether any one of a first analysis duration of the intersection analysis, a second analysis duration of the speed analysis, and a third analysis duration of the smoothness analysis exceeds the audit duration. When any one of the first analysis duration, the second analysis duration, and the third analysis duration exceeds the audit duration, the cloud server 10 determines that the audit condition is satisfied. For example, from 12:00 noon on the first day to 13:00 on the second day, the cloud server 10 has executed any of the intersection analysis, the speed analysis, or the smoothness analysis for 25 hours, which exceeds the audit duration, such as 24 hours. Therefore, the cloud server 10 determines that the audit condition is satisfied.

The smoothness analysis is used to determine the driver's behavior of stepping on the accelerator pedaling according to the accelerator pedaling information. The smoothness analysis is further used to analyze whether passenger experience is good according to the inertial measurement information.

Step S104: the cloud server 10 executes a supervised learning scoring process to generate an audit score according to the non-stop rate at corners, the times of non-stop corners, the average of minimum cornering speeds, the sharp deceleration duration, the rapid acceleration duration, the overspeed duration, the overspeed ratio, the average of maximum overspeeds, the rate of heavy accelerator pedaling, the times of vehicle body tilting forward, the times of vehicle body tilting backward, the times of vehicle body rolling, and the times of vehicle body vibrations.

Figure 6:
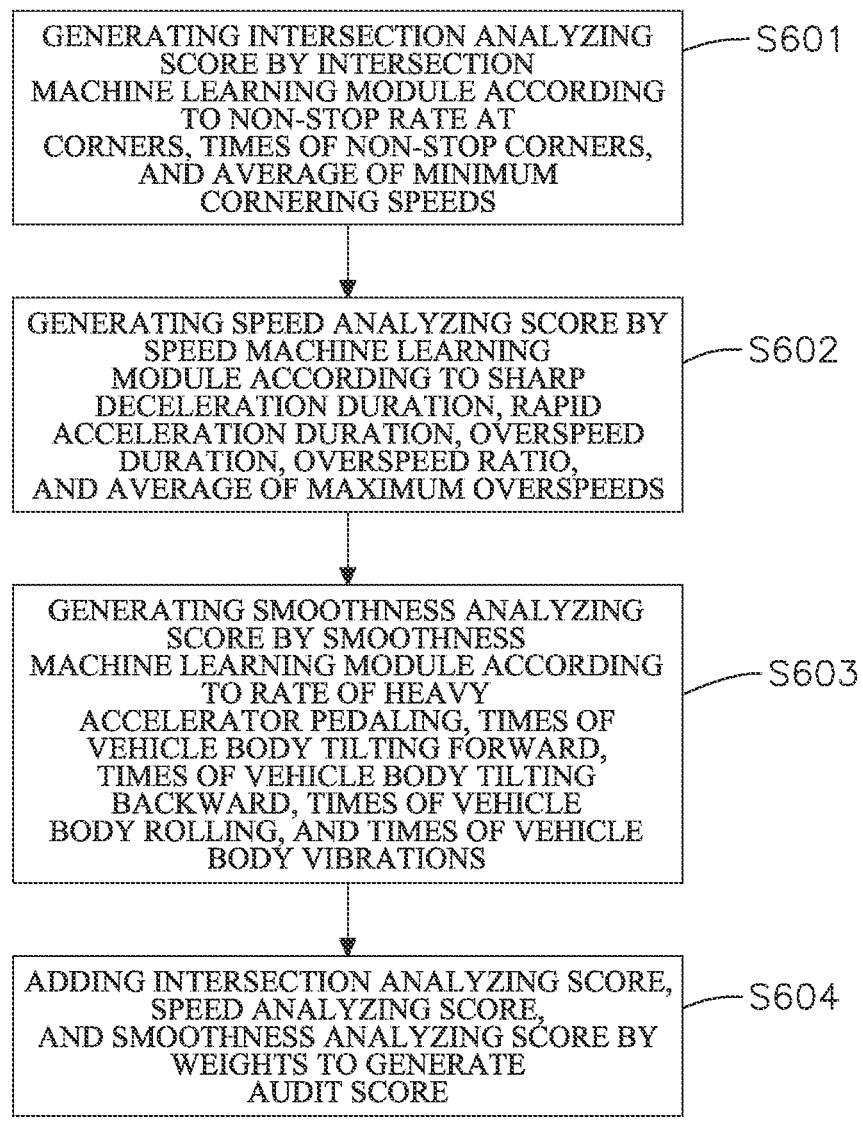
FIG. 6 is a flowchart of a first embodiment of a supervised learning scoring process of the method for inspecting and scoring vehicle transportation of the present invention.

Further with reference to FIG. 6, in step S601, when the cloud server 10 executes a first embodiment of the supervised learning scoring process, the cloud server 10 generates an intersection analyzing score by an intersection machine learning module according to the non-stop rate at corners, the times of non-stop corners, and the average of minimum cornering speeds. In step S602, the cloud server 10 further generates a speed analyzing score by a speed machine learning module according to the sharp deceleration duration, the rapid acceleration duration, the overspeed duration, the overspeed ratio, and the average of maximum overspeeds. In step S603, the cloud server 10 further generates a smoothness analyzing score by a smoothness machine learning module according to the rate of heavy accelerator pedaling, the times of vehicle body tilting forward, the times of vehicle body tilting backward, the times of vehicle body rolling, and the times of vehicle body vibrations. In step S604, the cloud server 10 further adds the intersection analyzing score, the speed analyzing score, and the smoothness analyzing score by weights to generate the audit score.

For example, the intersection machine learning module, the speed machine learning module, and the smoothness machine learning module are neural network modules using supervised learning or multiple regression analysis modules using supervised learning. Moreover, the present invention takes the non-stop rate at corners, the times of non-stop corners, and the average of minimum cornering speeds as key features of the intersection machine learning module, further takes the sharp deceleration duration, the rapid acceleration duration, the overspeed duration, the overspeed ratio, and the average of maximum overspeeds as key features of the speed machine learning module, and further takes the rate of heavy accelerator pedaling, the times of vehicle body tilting forward, the times of vehicle body tilting backward, the times of vehicle body rolling, and the times of vehicle body vibrations as key features of the smoothness machine learning module to train the intersection machine learning module, the speed machine learning module, and the smoothness machine learning module for generating the intersection analyzing score, the speed analyzing score, and the smoothness analyzing score.

The audit score is calculated by the following formula:

$$\text{audit score} = aw_a + bw_b + cw_c.$$

In the formula, a is the intersection analyzing score, b is the speed analyzing score, c is the smoothness analyzing score, $w_a$ is an intersection analyzing weight, $w_b$ is a speed analyzing weight, and $w_c$ is a smoothness analyzing weight.

Figure 7:
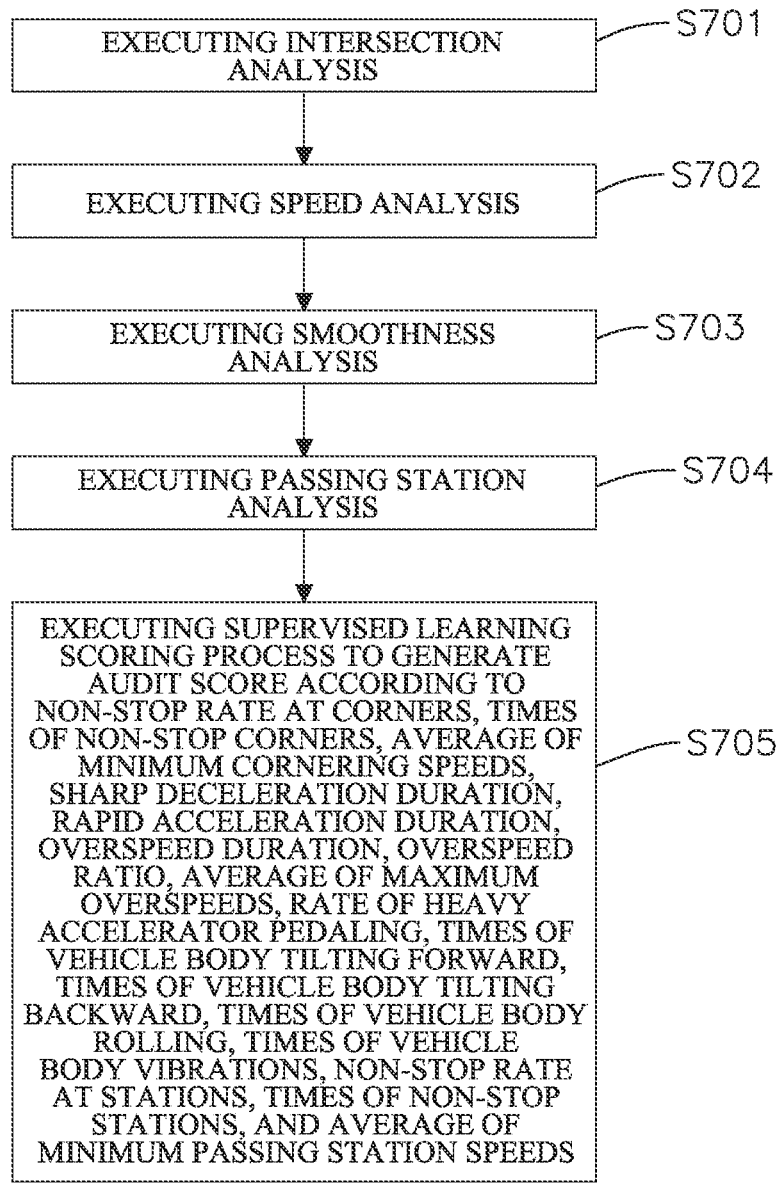
FIG. 7 is a flowchart of a second embodiment of the method for inspecting and scoring vehicle transportation of the present invention.

The intersection analyzing weight, the speed analyzing weight, and the smoothness analyzing weight can be adjusted based on a number of traffic cases and complaint incidents or key audit items. For example, the intersection analyzing weight can be adjusted based on the number of the accident caused by not giving way or improper turning. The speed analyzing weight can be adjusted based on the number of the accident caused by overspeeding or failure to maintain the distance. The smoothness analyzing weight can be adjusted based on the number of the accident caused by suddenly stopping or improper driving. Moreover, with reference to FIG. 7, differences between the first embodiment of the method for inspecting and scoring vehicle transportation and a second embodiment of the method for inspecting and scoring vehicle transportation are that the second embodiment further includes steps as follows:

Step S704: the cloud server 10 further executes a passing station analysis to generate a non-stop rate at stations, times of non-stop stations, and average of minimum passing station speeds.

Figure 8:
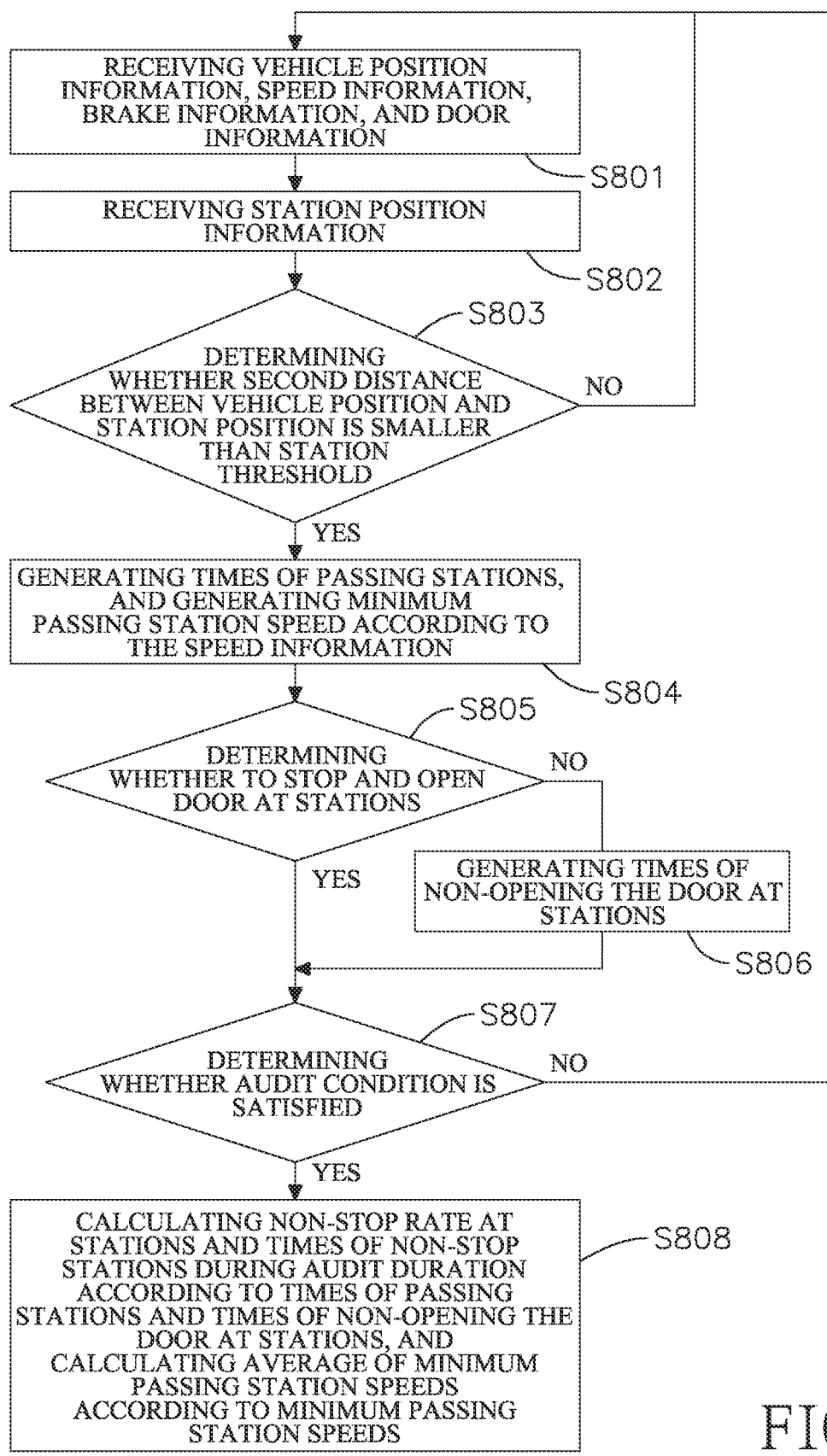
FIG. 8 is a flowchart of a passing station analysis of the method for inspecting and scoring vehicle transportation of the present invention.

Further with reference to FIG. 8, when the cloud server 10 executes the passing station analysis, the cloud server 10 is communicatively connected to the wireless transceiver 24 of the vehicle device 20. In step S801, the cloud server 10 receives the vehicle position information, the speed information, the brake information, and the door information from the wireless transceiver 24 of the vehicle device 20. In step S802, the cloud server 10 further receives station position information from the driving information database 30. In step S803, the cloud server 10 further determines whether a second distance between a vehicle position and a station position is smaller than a station threshold according to the vehicle position information and the station position information. In step S804, when the second distance is smaller than the station threshold, the cloud server 10 generates times of passing stations, and generates a minimum passing station speed according to the speed information. In step S805, the cloud server 10 determines whether to stop and open a door at stations according to the brake information and the door information. In step S806, when non-stopping and non-opening the door at the stations, the cloud server 10 generates times of non-opening the door at stations. In step S807, the cloud server 10 determines whether an audit condition is satisfied. In step S808, when the audit condition is satisfied, the cloud server 10 calculates the non-stop rate at stations and the times of non-stop stations during an audit duration according to the times of passing stations and the times of non-opening the door at stations, and calculates the average of minimum passing station speeds according to the minimum passing station speeds. When the audit condition is dissatisfied, the cloud server 10 receives the vehicle position information, the speed information, the brake information, and the door information from the wireless transceiver 24 of the vehicle device 20 again.

For example, the cloud server 10 determines the vehicle position by receiving the vehicle position information from the vehicle device 20, and compares the vehicle position with the station position obtained from the driving information database 30. When the second distance between the vehicle position and the station position is smaller than the station threshold, it means that the vehicle is close enough to the station. Generally speaking, when the vehicle is close enough to the station, it means that the vehicle is currently entering the station. Because when the vehicle passes through the station, the vehicle needs to slow down and stop at the station to let passengers get on and off the vehicle. If the cloud server 10 determines that the vehicle has not decelerated and stopped at the station based on the brake information and the door information, the driver's driving behavior is determined to be poor. Therefore, the cloud server 10 further uses the times of non-stop stations as one of the audit criteria.

When the audit condition is satisfied, the cloud server 10 can calculate the non-stop rate at stations, the times of non-stop stations, and the average of minimum passing station speeds according to a number of the stations and times of non-opening the door at stations. For example, the non-stop rate at stations is obtained by dividing the times of non-stop stations by the number of the stations. The average of minimum passing station speeds is an average of the minimum passing station speeds at the stations.

The passing station analysis uses the vehicle position information and the station position information to determine whether there is a stop when arriving at the station.

Step S705: when the cloud server 10 executes the supervised learning scoring process, the cloud server 10 generates the audit score further according to the non-stop rate at stations, the times of non-stop stations, and the average of minimum passing station speeds.

Figure 9:
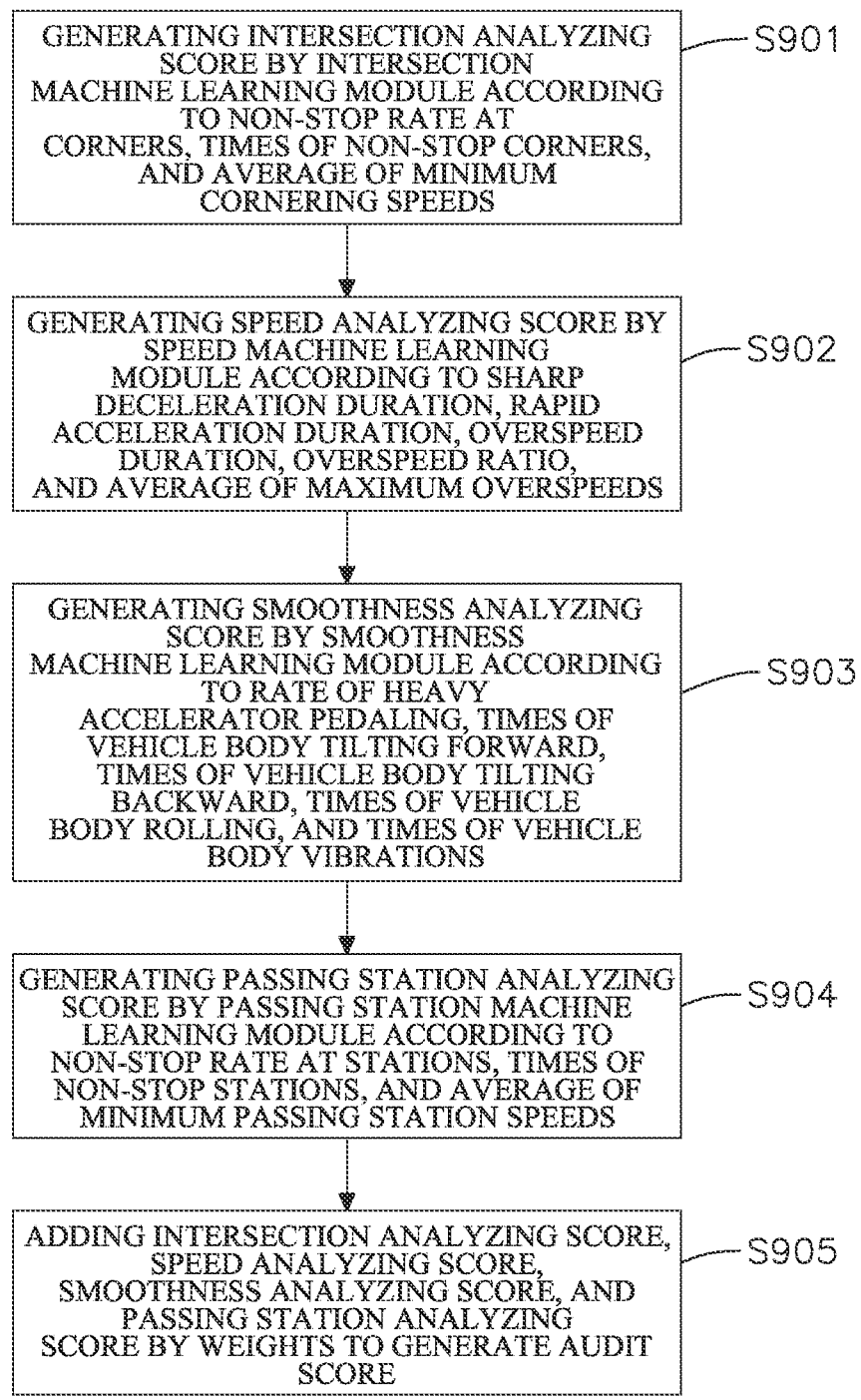
FIG. 9 is a flowchart of a second embodiment of a supervised learning scoring process of the method for inspecting and scoring vehicle transportation of the present invention.

Further with reference to FIG. 9, differences between the first embodiment of the supervised learning scoring process and a second embodiment of the supervised learning scoring process are that the second embodiment of the supervised learning scoring process further includes steps as follows:

Step S904: the cloud server 10 further generates a passing station analyzing score by a passing station machine learning module according to the non-stop rate at stations, the times of non-stop stations, and the average of minimum passing station speeds.

Step S905: the cloud server 10 further adds the intersection analyzing score, the speed analyzing score, the smoothness analyzing score, and the passing station analyzing score by weights to generate the audit score.

In the second embodiment, the present invention further includes the passing station analyzing. The passing station machine learning module is a neural network module using supervised learning or multiple regression analysis module using supervised learning. Similarly, the present invention takes the non-stop rate at stations, the times of non-stop stations, and the average of minimum passing station speeds as key features of the passing station machine learning module to train the passing station machine learning module for generating the passing station analyzing score.

The audit score is calculated by the following formula:

$$\text{audit score} = aw_a + bw_b + cw_c + dw_d$$

In the formula, d is the passing station analyzing score, $w_d$ is a passing station analyzing weight, and other parameters are the same as those in the first embodiment. Further, the passing station analyzing weight can be adjusted based on the number of the complaints for non-stop at the station or for improper stop not in accordance with the regulations.

As mentioned above, the present invention can automatically generate judgements of driving behaviors, and the judgements can be stored to provide the carriers in the vehicle transportation industry for inspecting the drivers' driving behaviors. The cloud server 10 may further transmit the judgements, such as the audit score, to a head-up display installed in the vehicle. Therefore, the judgements can be further displayed on the head-up display of the vehicle to remind the drivers for improving their driving behaviors.

In addition, the present invention establishes four analyses, appropriately analyzing whether the drive's driving behavior causes danger and whether the passenger has good experience. Further, the results of the four analyses are separately determined, and added by weights. Then, a final score and evaluations are given, so that the vehicle transportation industry can objectively and efficiently evaluate the driver's driving behaviors.

The above details only a few embodiments of the present invention, rather than imposing any forms of limitation to the present invention. Any professionals in related fields of expertise relating to the present invention, within the limitations of what is claimed, are free to make equivalent adjustments regarding the embodiments mentioned above. However, any simple adjustments and equivalent changes made without deviating from the present invention would be encompassed by what is claimed for the present invention.

What is claimed is:

1. A method for inspecting and scoring vehicle transportation, executed by a cloud server, and comprising steps of:
    executing an intersection analysis to generate a non-stop rate at corners, times of non-stop corners, and an average of minimum cornering speeds;
    executing a speed analysis to generate a sharp deceleration duration, a rapid acceleration duration, an overspeed duration, an overspeed ratio, and an average of maximum overspeeds;
    executing a smoothness analysis to generate a rate of heavy accelerator pedaling, times of vehicle body tilting forward, times of vehicle body tilting backward, times of vehicle body rolling, and times of vehicle body vibrations;
    executing a supervised learning scoring process to generate an audit score according to the non-stop rate at corners, the times of non-stop corners, the average of minimum cornering speeds, the sharp deceleration duration, the rapid acceleration duration, the overspeed duration, the overspeed ratio, the average of maximum overspeeds, the rate of heavy accelerator pedaling, the times of vehicle body tilting forward, the times of vehicle body tilting backward, the times of vehicle body rolling, and the times of vehicle body vibrations.

2. The method for inspecting and scoring the vehicle transportation as claimed in claim 1, wherein the supervised learning scoring process comprises steps of:
    generating an intersection analyzing score by an intersection machine learning module according to the non-stop rate at corners, the times of non-stop corners, and the average of minimum cornering speeds;
    generating a speed analyzing score by a speed machine learning module according to the sharp deceleration duration, the rapid acceleration duration, the overspeed duration, the overspeed ratio, and the average of maximum overspeeds;
    generating a smoothness analyzing score by a smoothness machine learning module according to the rate of heavy accelerator pedaling, the times of vehicle body tilting forward, the times of vehicle body tilting backward, the times of vehicle body rolling, and the times of vehicle body vibrations;
    adding the intersection analyzing score, the speed analyzing score, and the smoothness analyzing score by weights to generate the audit score.

3. The method for inspecting and scoring the vehicle transportation as claimed in claim 1, wherein the intersection analysis comprises steps of:
    acquiring vehicle position information, speed information, and brake information;
    acquiring traffic sign position information;
    determining whether a first distance between a vehicle position and a traffic sign position is smaller than an intersection threshold according to the vehicle position information and the traffic sign position information;
    when the first distance is smaller than the intersection threshold, generating times of cornering, generating minimum cornering speeds according to the speed information, and determining whether to stop for more than a stop duration threshold according to the brake information;
    when non-stopping for more than the stop duration threshold, generating times of non-stop interactions, and determining whether an audit condition is satisfied;
    when the audit condition is satisfied, calculating the non-stop rate at corners and the times of non-stop corners during the audit duration according to the times of cornering and the times of non-stop interactions, and calculating the average of minimum cornering speeds according to the minimum cornering speed;
    when the audit condition is dissatisfied, reacquiring the vehicle position information, the speed information, and the brake information.

4. The method for inspecting and scoring the vehicle transportation as claimed in claim 1, wherein the speed analysis comprises steps of:
    acquiring vehicle position information and speed information;
    acquiring route speed limit information;
    generating location speed limit information according to the vehicle position information and the route speed limit information;
    determining whether a vehicle speed exceeds a location speed limit according to the speed information and the location speed limit information;
    when the vehicle speed exceeds the location speed limit, calculating the overspeed duration, generating maximum overspeeds according to the speed information, and determining whether an audit condition is satisfied;

determining whether a first difference between a maximum and a minimum during an acceleration duration is greater than a first threshold;

when the first difference is greater than the first threshold, generating the rapid acceleration duration, and determining whether the audit condition is satisfied;

determining a second difference between a maximum and a minimum during a deceleration duration is greater than a second threshold;

when the second difference is greater than the second threshold, generating the sharp deceleration duration, and determining whether the audit condition is satisfied;

when the audit condition is satisfied, calculating the overspeed ratio during an audit duration according to the overspeed duration, and calculating the average of maximum overspeeds according to the maximum overspeeds;

when the audit condition is dissatisfied, reacquiring the vehicle position information and speed information.

5. The method for inspecting and scoring the vehicle transportation as claimed in claim 1, wherein the smoothness analysis comprises steps of:

acquiring inertial measurement information and accelerator pedaling information;

determining whether an accelerator pedaling depth is greater than a depth threshold according to the accelerator pedaling information;

when the accelerator pedaling depth is greater than the depth threshold, generating a duration of heavy accelerator pedaling, and determining whether an audit condition is satisfied;

determining whether a first absolute value of a first axial acceleration is greater than a first acceleration threshold, determining whether a second absolute value of a second axial acceleration is greater than a second acceleration threshold, and determining whether a third absolute value of a third axial acceleration is greater than a third acceleration threshold;

when the first absolute value is greater than the first acceleration threshold, and when the first axial acceleration is a positive value, generating the times of vehicle body tilting forward, and determining whether the audit condition is satisfied;

when the first absolute value is greater than the first acceleration threshold, and when the first axial acceleration is a negative value, generating the times of vehicle body tilting backward, and determining whether the audit condition is satisfied;

when the second absolute value is greater than the second acceleration threshold, generating the times of vehicle body rolling, and determining whether the audit condition is satisfied;

when the third absolute value is greater than the third acceleration threshold, generating the times of vehicle body vibrations, and determining whether the audit condition is satisfied;

when the audit condition is satisfied, calculating the rate of heavy accelerator pedaling during an audit duration according to the duration of heavy accelerator pedaling;

when the audit condition is dissatisfied, reacquiring the inertial measurement information and the accelerator pedaling information.

6. The method for inspecting and scoring the vehicle transportation as claimed in claim 5, wherein:

the first acceleration threshold is calculated by multiplying a square of the first axial acceleration and a dynamic adjustment parameter;

the second acceleration threshold is calculated by multiplying a square of the second axial acceleration and the dynamic adjustment parameter;

the third acceleration threshold is calculated by multiplying a square of the third axial acceleration and the dynamic adjustment parameter.

7. The method for inspecting and scoring the vehicle transportation as claimed in claim 3, wherein the audit condition is determining whether a first analyzing duration of executing the intersection analysis, a second analyzing duration of executing the speed analysis, or a third analyzing duration of executing the smoothness analysis is greater than the audit duration;

when the first analyzing duration, the second analyzing duration, or the third analyzing duration is greater than the audit duration, the audit condition is satisfied.

8. The method for inspecting and scoring the vehicle transportation as claimed in claim 1, further comprising steps of:

executing a passing station analysis to generate a non-stop rate at stations, times of non-stop stations, and an average of minimum passing station speeds;

wherein when executing the supervised learning scoring process, generating the audit score further according to the non-stop rate at stations, the times of non-stop stations, and the average of minimum passing station speeds.

9. The method for inspecting and scoring the vehicle transportation as claimed in claim 8, wherein the supervised learning scoring process comprises steps of:

generating an intersection analyzing score by an intersection machine learning module according to the non-stop rate at corners, the times of non-stop corners, and the average of minimum cornering speeds;

generating a speed analyzing score by a speed machine learning module according to the sharp deceleration duration, the rapid acceleration duration, the overspeed duration, the overspeed ratio, and the average of maximum overspeeds;

generating a smoothness analyzing score by a smoothness machine learning module according to the rate of heavy accelerator pedaling, the times of vehicle body tilting forward, the times of vehicle body tilting backward, the times of vehicle body rolling, and the times of vehicle body vibrations;

generating a passing station analyzing score by a passing station machine learning module according to the non-stop rate at stations, the times of non-stop stations, and the average of minimum passing station speeds;

adding the intersection analyzing score, the speed analyzing score, the smoothness analyzing score, and the passing station analyzing score by weights to generate the audit score.

10. The method for inspecting and scoring the vehicle transportation as claimed in claim 9, wherein the passing station analysis comprises steps of:

acquiring vehicle position information, speed information, brake information, and door information;

acquiring station position information;

determining whether a second distance between a vehicle position and a station position is smaller than a station threshold according to the vehicle position information and the station position information;

when the second distance is smaller than the station threshold, generating times of passing stations, generating a minimum passing station speed according to the speed information, and determining whether to stop and open a door at stations according to the brake information and the door information;

when non-stopping and non-opening the door at the stations, generating times of non-opening the door at stations, and determining whether an audit condition is satisfied;

when the audit condition is satisfied, calculating the non-stop rate at stations and the times of non-stop stations during an audit duration according to the times of passing stations and the times of non-opening the door at stations, and calculating the average of minimum passing station speeds according to the minimum passing station speeds;

when the audit condition is dissatisfied, reacquiring the vehicle position information, the speed information, the brake information, and the door information.

11. A system for inspecting and scoring vehicle transportation, comprising:
a cloud server, executing an intersection analysis to generate a non-stop rate at corners, times of non-stop corners, and an average of minimum cornering speeds;
wherein the cloud server further executes a speed analysis to generate a sharp deceleration duration, a rapid acceleration duration, an overspeed duration, an overspeed ratio, and an average of maximum overspeeds;
wherein the cloud server further executes a smoothness analysis to generate a rate of heavy accelerator pedaling, times of vehicle body tilting forward, times of vehicle body tilting backward, times of vehicle body rolling, and times of vehicle body vibrations;
wherein the cloud server further executes a supervised learning scoring process to generate an audit score according to the non-stop rate at corners, the times of non-stop corners, the average of minimum cornering speeds, the sharp deceleration duration, the rapid acceleration duration, the overspeed duration, the overspeed ratio, the average of maximum overspeeds, the rate of heavy accelerator pedaling, the times of vehicle body tilting forward, the times of vehicle body tilting backward, the times of vehicle body rolling, and the times of vehicle body vibrations.

12. The system for inspecting and scoring the vehicle transportation as claimed in claim 11, wherein when the cloud server executes the supervised learning scoring process, the cloud server generates an intersection analyzing score by an intersection machine learning module according to the non-stop rate at corners, the times of non-stop corners, and the average of minimum cornering speeds;
wherein the cloud server further generates a speed analyzing score by a speed machine learning module according to the sharp deceleration duration, the rapid acceleration duration, the overspeed duration, the overspeed ratio, and the average of maximum overspeeds;
wherein the cloud server further generates a smoothness analyzing score by a smoothness machine learning module according to the rate of heavy accelerator pedaling, the times of vehicle body tilting forward, the times of vehicle body tilting backward, the times of vehicle body rolling, and the times of vehicle body vibrations;
wherein the cloud server further adds the intersection analyzing score, the speed analyzing score, and the smoothness analyzing score by weights to generate the audit score.

13. The system for inspecting and scoring the vehicle transportation as claimed in claim 11, further comprising:
a vehicle device, installed in a vehicle, and comprising:
a positioning unit, generating vehicle position information according to a position of the vehicle;
a vehicle information acquiring unit, generating speed information and brake information by sensing a state of the vehicle;
a wireless transceiver, connected to the positioning unit and the vehicle information acquiring unit, receiving the vehicle position information, the speed information, and the brake information from the positioning unit and the vehicle information acquiring unit, and transmitting the vehicle position information, the speed information, and the brake information to the cloud server;
wherein the cloud server is communicatively connected to the wireless transceiver of the vehicle device, and when the cloud server executes the intersection analysis, the cloud server receives the vehicle position information, the speed information, and the brake information from the wireless transceiver of the vehicle device, and the cloud server further receives traffic sign position information from a driving information database;
wherein the cloud server further determines whether a first distance between a vehicle position and a traffic sign position is smaller than an intersection threshold according to the vehicle position information and the traffic sign position information;
wherein when the first distance is smaller than the intersection threshold, the cloud server generates times of cornering, generates minimum cornering speeds according to the speed information, and determines whether to stop for more than a stop duration threshold according to the brake information;
wherein when non-stopping for more than the stop duration threshold, the cloud server generates times of non-stop interactions, and determines whether an audit condition is satisfied;
wherein when the audit condition is satisfied, the cloud server calculates the non-stop rate at corners and the times of non-stop corners during an audit duration according to the times of cornering and the times of non-stop interactions, and calculates the average of minimum cornering speeds according to the minimum cornering speed;
wherein when the audit condition is dissatisfied, the cloud server receives the vehicle position information, the speed information, and the brake information from the wireless transceiver of the vehicle device again.

14. The system for inspecting and scoring the vehicle transportation as claimed in claim 11, further comprising:
a vehicle device, installed in a vehicle, and comprising:
a positioning unit, generating vehicle position information according to a position of the vehicle;
a vehicle information acquiring unit, generating speed information by sensing a state of the vehicle;
a wireless transceiver, connected to the positioning unit and the vehicle information acquiring unit, receiving the vehicle position information and the speed information from the positioning unit and the vehicle information acquiring unit, and transmitting the vehicle position information and the speed information to the cloud server;

wherein the cloud server is communicatively connected to the wireless transceiver of the vehicle device, and when the cloud server executes the speed analysis, the cloud server receives the vehicle position information and the speed information, and the cloud server further receives route speed limit information from a driving information database;

wherein the cloud server further generates location speed limit information according to the vehicle position information and the route speed limit information, and the cloud server determines whether a vehicle speed exceeds a location speed limit according to the speed information and the location speed limit information;

wherein when the vehicle speed exceeds the location speed limit, the cloud server further calculates the overspeed duration, generates maximum overspeeds according to the speed information, and determines whether an audit condition is satisfied;

wherein the cloud server further determines whether a first difference between a maximum and a minimum during an acceleration duration is greater than a first threshold;

wherein when the first difference is greater than the first threshold, the cloud server generates the rapid acceleration duration, and determines whether the audit condition is satisfied;

wherein the cloud server further determines a second difference between a maximum and a minimum during a deceleration duration is greater than a second threshold;

wherein when the second difference is greater than the second threshold, the cloud server generates the sharp deceleration duration, and determines whether the audit condition is satisfied;

wherein when the audit condition is satisfied, the cloud server calculates the overspeed ratio during an audit duration according to the overspeed duration, and calculates the average of maximum overspeeds according to the maximum overspeeds;

wherein when the audit condition is dissatisfied, the cloud server receives the vehicle position information and speed information from the wireless transceiver of the vehicle device again.

15. The system for inspecting and scoring the vehicle transportation as claimed in claim 11, further comprising:
a vehicle device, installed in a vehicle, and comprising:
a vehicle information acquiring unit, generating accelerator pedaling information by sensing a state of the vehicle;
an inertial measurement unit, generating inertial measurement information by sensing the vehicle;
a wireless transceiver, connected to the vehicle information acquiring unit and the inertial measurement unit, receiving the accelerator pedaling information and the inertial measurement information from the vehicle information acquiring unit and the inertial measurement unit, and transmitting the accelerator pedaling information and the inertial measurement information to the cloud server;

wherein the cloud server is communicatively connected to the wireless transceiver of the vehicle device, and when the cloud server executes the smoothness analysis, the cloud server receives the inertial measurement information and the accelerator pedaling information from the wireless transceiver of the vehicle device, and the cloud server further determines whether an accelerator pedaling depth is greater than a depth threshold according to the accelerator pedaling information;

wherein when the accelerator pedaling depth is greater than the depth threshold, the cloud server generates a duration of heavy accelerator pedaling, and determines whether an audit condition is satisfied;

wherein the cloud server further determines whether a first absolute value of a first axial acceleration is greater than a first acceleration threshold, determines whether a second absolute value of a second axial acceleration is greater than a second acceleration threshold, and determines whether a third absolute value of a third axial acceleration is greater than a third acceleration threshold;

wherein when the first absolute value is greater than the first acceleration threshold, and when the first axial acceleration is a positive value, the cloud server generates the times of vehicle body tilting forward, and determines whether the audit condition is satisfied;

wherein when the first absolute value is greater than the first acceleration threshold and when the first axial acceleration is a negative value, the cloud server generates the times of vehicle body tilting backward, and determines whether the audit condition is satisfied;

wherein when the second absolute value is greater than the second acceleration threshold, the cloud server generates the times of vehicle body rolling, and determines whether the audit condition is satisfied;

wherein when the third absolute value is greater than the third acceleration threshold, the cloud server generates the times of vehicle body vibrations, and determines whether the audit condition is satisfied;

wherein when the audit condition is satisfied, the cloud server calculates the rate of heavy accelerator pedaling during an audit duration according to the duration of heavy accelerator pedaling;

wherein when the audit condition is dissatisfied, the cloud server receives the inertial measurement information and the accelerator pedaling information from the wireless transceiver of the vehicle device again.

16. The system for inspecting and scoring the vehicle transportation as claimed in claim 15, wherein:
the first acceleration threshold is calculated by multiplying a square of the first axial acceleration and a dynamic adjustment parameter;
the second acceleration threshold is calculated by multiplying a square of the second axial acceleration and the dynamic adjustment parameter;
the third acceleration threshold is calculated by multiplying a square of the third axial acceleration and the dynamic adjustment parameter.

17. The system for inspecting and scoring the vehicle transportation as claimed in claim 13, wherein the cloud server determines whether a first analyzing duration of executing the intersection analysis, a second analyzing duration of executing the speed analysis, or a third analyzing duration of executing the smoothness analysis is greater than the audit duration;

wherein when the first analyzing duration, the second analyzing duration, or the third analyzing duration is greater than the audit duration, the cloud server determines that the audit condition is satisfied.

18. The system for inspecting and scoring the vehicle transportation as claimed in claim 11, wherein the cloud server further executes a passing station analysis to generate a non-stop rate at stations, times of non-stop stations, and an average of minimum passing station speeds;

wherein when the cloud server executes the supervised learning scoring process, the cloud server generates the audit score further according to the non-stop rate at stations, the times of non-stop stations, and the average of minimum passing station speeds.

19. The system for inspecting and scoring the vehicle transportation as claimed in claim 18, wherein when the cloud server executes the supervised learning scoring process, the cloud server generates an intersection analyzing score by an intersection machine learning module according to the non-stop rate at corners, the times of non-stop corners, and the average of minimum cornering speeds;

wherein the cloud server further generates a speed analyzing score by a speed machine learning module according to the sharp deceleration duration, the rapid acceleration duration, the overspeed duration, the overspeed ratio, and the average of maximum overspeeds;

wherein the cloud server further generates a smoothness analyzing score by a smoothness machine learning module according to the rate of heavy accelerator pedaling, the times of vehicle body tilting forward, the times of vehicle body tilting backward, the times of vehicle body rolling, and the times of vehicle body vibrations;

wherein the cloud server further generates a passing station analyzing score by a passing station machine learning module according to the non-stop rate at stations, the times of non-stop stations, and the average of minimum passing station speeds;

wherein the cloud server further adds the intersection analyzing score, the speed analyzing score, the smoothness analyzing score, and the passing station analyzing score by weights to generate the audit score.

20. The system for inspecting and scoring the vehicle transportation as claimed in claim 19, further comprising:

a vehicle device, installed in a vehicle, and comprising:

a positioning unit, generating vehicle position information according to a position of the vehicle;

a vehicle information acquiring unit, generating speed information, brake information, and door information by sensing a state of the vehicle;

a wireless transceiver, connected to the positioning unit and the vehicle information acquiring unit, receiving the vehicle position information, the speed information, the brake information, and the door information from the positioning unit and the vehicle information acquiring unit, and transmitting the vehicle position information, the speed information, the brake information, and the door information to the cloud server;

wherein the cloud server is communicatively connected to the wireless transceiver of the vehicle device, and when the cloud server executes the passing station analysis, the cloud server receives the vehicle position information, the speed information, the brake information, and the door information from the wireless transceiver of the vehicle device, the cloud server further receives station position information from a driving information database, and the cloud server further determines whether a second distance between a vehicle position and a station position is smaller than a station threshold according to the vehicle position information and the station position information;

wherein when the second distance is smaller than the station threshold, the cloud server generates times of passing stations, generates a minimum passing station speed according to the speed information, and determines whether to stop and open a door at stations according to the brake information and the door information;

wherein when non-stopping and non-opening the door at the stations, the cloud server generates times of non-opening the door at stations, and determines whether an audit condition is satisfied;

wherein when the audit condition is satisfied, the cloud server calculates the non-stop rate at stations and the times of non-stop stations during an audit duration according to the times of passing stations and the times of non-opening the door at stations, and calculates the average of minimum passing station speeds according to the minimum passing station speeds;

wherein when the audit condition is dissatisfied, the cloud server receives the vehicle position information, the speed information, the brake information, and the door information from the wireless transceiver of the vehicle device again.

21. The system for inspecting and scoring the vehicle transportation as claimed in claim 11, wherein the cloud server further transmits the audit score to a display installed in a vehicle for displaying.

\* \* \* \* \*